United States Patent
Mishima et al.

(10) Patent No.: US 12,427,669 B2
(45) Date of Patent: Sep. 30, 2025

(54) INFORMATION PROCESSING DEVICE, INFORMATION PROCESSING METHOD, AND PROGRAM

(71) Applicant: OMRON Corporation, Kyoto (JP)

(72) Inventors: Kazuma Mishima, Kyoto (JP); Yoichi Bamba, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 161 days.

(21) Appl. No.: 18/548,976

(22) PCT Filed: Dec. 20, 2021

(86) PCT No.: PCT/JP2021/047119
§ 371 (c)(1),
(2) Date: Sep. 5, 2023

(87) PCT Pub. No.: WO2022/190537
PCT Pub. Date: Sep. 15, 2022

(65) Prior Publication Data
US 2024/0149455 A1    May 9, 2024

(30) Foreign Application Priority Data
Mar. 12, 2021 (JP) .................... 2021-040409

(51) Int. Cl.
*B25J 9/16* (2006.01)
*B25J 19/02* (2006.01)

(52) U.S. Cl.
CPC .......... *B25J 9/1676* (2013.01); *B25J 9/1671* (2013.01); *B25J 19/023* (2013.01)

(58) Field of Classification Search
CPC ...... B25J 9/1676; B25J 9/1671; B25J 19/023; B25J 9/1674; G05B 2219/40203;
(Continued)

(56) References Cited

U.S. PATENT DOCUMENTS

| | | |
|---|---|---|
| 2003/0090483 A1 | 5/2003 | Watanabe et al. |
| 2018/0222050 A1 | 8/2018 | Vu et al. |

(Continued)

FOREIGN PATENT DOCUMENTS

| | | |
|---|---|---|
| JP | 2003150219 A | 5/2003 |
| JP | 2014079824 A | 5/2014 |

(Continued)

OTHER PUBLICATIONS

Extended European search report issued in 21930382.3 dated Feb. 7, 2025.
(Continued)

*Primary Examiner* — Kira Nguyen
(74) *Attorney, Agent, or Firm* — ROSSI, KIMMS & McDOWELL LLP

(57) ABSTRACT

An information processing apparatus includes a distance information acquisition unit configured to acquire distance information obtained by measurement by a sensor, an area information acquisition unit configured to acquire information relating to a virtual three-dimensional protection area set within a measurable region of the sensor, a blind spot calculation unit configured to calculate a three-dimensional blind spot region representing a blind spot of the sensor, on the basis of the distance information, and a display unit configured to display the protection area and the blind spot region in a virtual three-dimensional space.

16 Claims, 5 Drawing Sheets

(58) Field of Classification Search
CPC ...... G05B 2219/40478; G05B 19/4061; G05B 2219/40201; G05B 2219/40607
USPC .......................................................... 700/255
See application file for complete search history.

(56) References Cited

U.S. PATENT DOCUMENTS

| | | | |
|---|---|---|---|
| 2019/0007659 A1 | 1/2019 | Neubauer et al. | |
| 2019/0340909 A1* | 11/2019 | Nguyen | B25J 9/1676 |
| 2019/0378264 A1* | 12/2019 | Braune | G06V 20/52 |
| 2020/0134322 A1 | 4/2020 | Takahashi et al. | |
| 2021/0197383 A1* | 7/2021 | Passot | G06V 20/10 |
| 2023/0271317 A1* | 8/2023 | Wakayama | G06T 7/90 |
| | | | 700/251 |
| 2024/0123622 A1* | 4/2024 | Mishima | B25J 9/1674 |

FOREIGN PATENT DOCUMENTS

| | | |
|---|---|---|
| JP | 2020511325 A | 4/2020 |
| JP | 2020069572 A | 5/2020 |
| JP | 2020075325 A | 5/2020 |
| WO | 2018148181 A1 | 8/2018 |

OTHER PUBLICATIONS

Peter Anderson-Sprecher: "Intelligent Monitoring of Assembly Operations." Master Thesis, Jun. 1, 2011, pp. 1-43, XP055276348, Retrieved from the Internet: URL:https://www.ri.cmu.edu/pub_files/2011/6/andersonsprecher_thesis.pdf.

Rybski et al.: "Sensor Fusion for Human Safety in Industrial Workcells." 2012 IEEE/RSJ International Conference on Intelligent Robots and Systems, Oct. 7, 2012, pp. 3612-3619.

International Search Report issued in Intl. Appln. No. PCT/JP2021/047119 mailed Mar. 8, 2022. English translation provided.

Written Opinion issued in Intl. Appln. No. PCT/JP2021/047119 mailed Mar. 8, 2022. English translation provided.

* cited by examiner

INFORMATION PROCESSING DEVICE, INFORMATION PROCESSING METHOD, AND PROGRAM

TECHNICAL FIELD

The present invention relates to an information processing apparatus, an information processing method, and a program.

BACKGROUND ART

In situations where monitoring is required, such as a production site, a sensor is used to detect an object such as a human body. To reliably detect an object, a sensor needs to be installed at an appropriate position and orientation and an area to be monitored is appropriately set. However, it is not easy for a user to determine whether the installation position and orientation of a distance sensor are appropriate or whether the area to be monitored is appropriately set.

Patent Document 1 discloses a system of monitoring a work space for safety purposes by using a 3D sensor. In this system, a three-dimensional conical space monitored by the 3D sensor is displayed classified into a space marked as "unoccupied" in which no obstacle is detected, a space marked as "occupied" in which an object is detected, and a space marked as "unknown" in which a detected object causes a blind spot region of the 3D sensor.

CITATION LIST

Patent Literature

Patent Document 1: Japanese Translation of PCT International Application Publication No. 2020-511325 A

SUMMARY OF INVENTION

Technical Problem

However, in Patent Document 1, it is not easy for the user to recognize whether the space marked as "unknown" is a critical blind spot region.

An object of the present invention is to provide a technique with which a user can easily recognize a critical blind spot region.

Solution to Problem

To achieve the above-mentioned object, the present invention adopts the following configuration.

A first aspect of the present invention provides an information processing apparatus including a distance information acquisition unit configured to acquire distance information obtained by measurement by a sensor, an area information acquisition unit configured to acquire information relating to a virtual three-dimensional protection area set within a measurable region of the sensor, a blind spot calculation unit configured to calculate a three-dimensional blind spot region representing a blind spot of the sensor, on the basis of the distance information, and a display unit configured to display the protection area and the blind spot region in a virtual three-dimensional space.

The "sensor" is a sensor that can obtain three-dimensional information by measurement and is, for example, a time-of-flight (TOF) sensor.

With this configuration, the three-dimensional blind spot region representing a blind spot of the sensor is calculated on the basis of the distance information obtained by measurement by the sensor, and the protection area and the blind spot region are displayed in the virtual three-dimensional space. As a result, since the protection area and the blind spot region are visualized and the user can visually confirm the positional and size relationship between the protection area and the blind spot region, a critical blind spot region can be easily recognized.

The display unit may further display a point cloud based on the distance information in the virtual three-dimensional space. Each point constituting the point cloud corresponds to a point (measurement point) on the surface of an object for which the sensor measured distance. Therefore, displaying the point cloud in the virtual three-dimensional space makes it possible to represent (the outline of) the object present in the measurable region. As a result, the user can recognize the positional and size relationship between the protection area and an object present inside or in the vicinity of the protection area, the blind spot region generated by the object, and the like.

The area information acquisition unit may acquire a 3D model of an object present in the measurable region, and the display unit may further display the 3D model in the virtual three-dimensional space. This "3D model" is data not obtained by measurement by a sensor but is rather three-dimensional data defining the outline of each object, such as CAD data. When such a 3D model is used to display the objects, the objects present in the measurable region can be displayed more accurately and in more detail. As a result, the user can recognize the positional and size relationship between the protection area and an object present inside or in the vicinity of the protection area, the blind spot region generated by the object, and the like.

Furthermore, the information processing apparatus may further include a warning unit configured to issue a warning in a case where the blind spot region is at least partially present in the protection area. In a case where a blind spot of the sensor is present in the protection area, there is a possibility that an intruding object intruding into the protection area cannot be detected. Therefore, a state in which a blind spot region is present in the protection area is a critical problem. Thus, by issuing the warning as described above, the user can more easily recognize the critical blind spot region.

Furthermore, the warning unit may issue a hazard warning in a case where a size of the blind spot region present in the protection area is greater than or equal to a threshold value. With this configuration, in a case where the blind spot region in the protection area is large enough for a person to enter, for example, the user can be alerted to the fact that the sensor arrangement is hazardous.

Furthermore, a range of the protection area displayed in the virtual three-dimensional space may be configurable by a user operation. This facilitates appropriate setting of the protection area.

A work machine may be installed in the measurable region, and the blind spot calculation unit may calculate a blind spot region generated by the work machine. This is performed because there is a high possibility that a worker will approach the work machine, and thus the blind spot region generated by the work machine is often critical.

Furthermore, the work machine may be a robot, the information processing apparatus may further include a recognition unit configured to recognize a movement range of the robot from pieces of the distance information obtained by measurement by the sensor at a plurality of timings while the robot is being moved, and the blind spot calculation unit may calculate the blind spot region from the movement range of the robot, and the display unit may display the movement range superimposed in the virtual three-dimensional space. With this configuration, the user can easily recognize the blind spot region viewed from the sensor and generated by the operation of the robot. Furthermore, the information processing apparatus may further include an instruction transmission unit configured to, in a case where the blind spot region generated by the robot is present in the protection area, transmit to the robot an instruction to change the movement range such that the blind spot region becomes smaller. With this configuration, it is possible to provide the robot with feedback of the measurement result obtained by the sensor.

Furthermore, the recognition unit may convert each of the pieces of the distance information obtained by measurement by the sensor at the plurality of timings into object range information indicating ranges occupied by individual objects in the measurable region, may exclude, from the object range information, surrounding environment information indicating a range occupied by an object other than the robot in the measurable region to generate actual operation information indicating a range occupied by the robot in the measurable region, and may calculate the movement range of the robot by superimposing pieces of the actual operation information acquired at the plurality of timings. With this configuration, the movement range of the robot can be determined in a short amount of time.

The robot may further include a setting unit configured to set the surrounding environment information on the basis of the distance information obtained by measurement by the sensor in a state where the robot is stopped. With this configuration, the position of the object in the measurable region can be easily detected by using the sensor.

Each of the pieces of distance information obtained by measurement by the sensor at the plurality of timings may be distance information obtained by measurement by the sensor while the robot is being moved in the same way as the actual operation. With this configuration, it is possible to set the same blind spot region as that generated during the actual operation.

The blind spot calculation unit may further calculate the blind spot region on the basis of the surrounding environment information. With this configuration, the user can more easily recognize the critical blind spot region.

The information processing apparatus may further include a second blind spot calculation unit configured to calculate a second blind spot region representing a possible blind spot of the sensor from a maximum movable range of the robot. The display unit may further display the second blind spot region superimposed in the virtual three-dimensional space in a state where the second blind spot region is distinguishable from a blind spot region calculated from the movement range of the robot. With this configuration, the user can recognize a critical blind spot region in the maximum movable range of the robot.

The information processing apparatus may further include a second blind spot calculation unit configured to calculate a second blind spot region representing a possible blind spot of the sensor from a maximum movable range of the robot. The display unit may display the blind spot region calculated from the movement range of the robot or the second blind spot region, which is superimposed in the virtual three-dimensional space, switching the blind spot region and the second blind spot region. With this configuration, the user can recognize a critical blind spot region in the maximum movable range of the robot.

A second aspect of the present invention provides an information processing method including a step of acquiring distance information obtained by measurement by a sensor, a step of acquiring information relating to a virtual three-dimensional protection area set in a measurable region of the sensor, a step of calculating a three-dimensional blind spot region representing a blind spot of the sensor, on the basis of the distance information, and a step of displaying the protection area and the blind spot region in a virtual three-dimensional space.

A third aspect of the present invention provides a program that causes a computer to execute each step of the information processing method described above.

The present invention may be regarded as an information processing apparatus, a blind spot display apparatus, a blind spot confirmation apparatus, or the like including at least some of the above-described units, or may be regarded as an object detection system, a monitoring system, or the like including these apparatuses and sensors. The present invention may also be regarded as an information processing method, a blind spot display method, a blind spot confirmation method, an object detection method, a monitoring method, or a control method including at least some of the processing described above. Furthermore, the present invention can be regarded as a program for realizing such a method and a recording medium in which the program is non-temporarily recorded. Note that the above-described units and processing can be combined as much as possible to constitute the present invention.

Advantageous Effects of Invention

According to the present invention, the user can easily recognize a critical blind spot region.

DESCRIPTION OF EMBODIMENTS

Application Example

Figure 1:
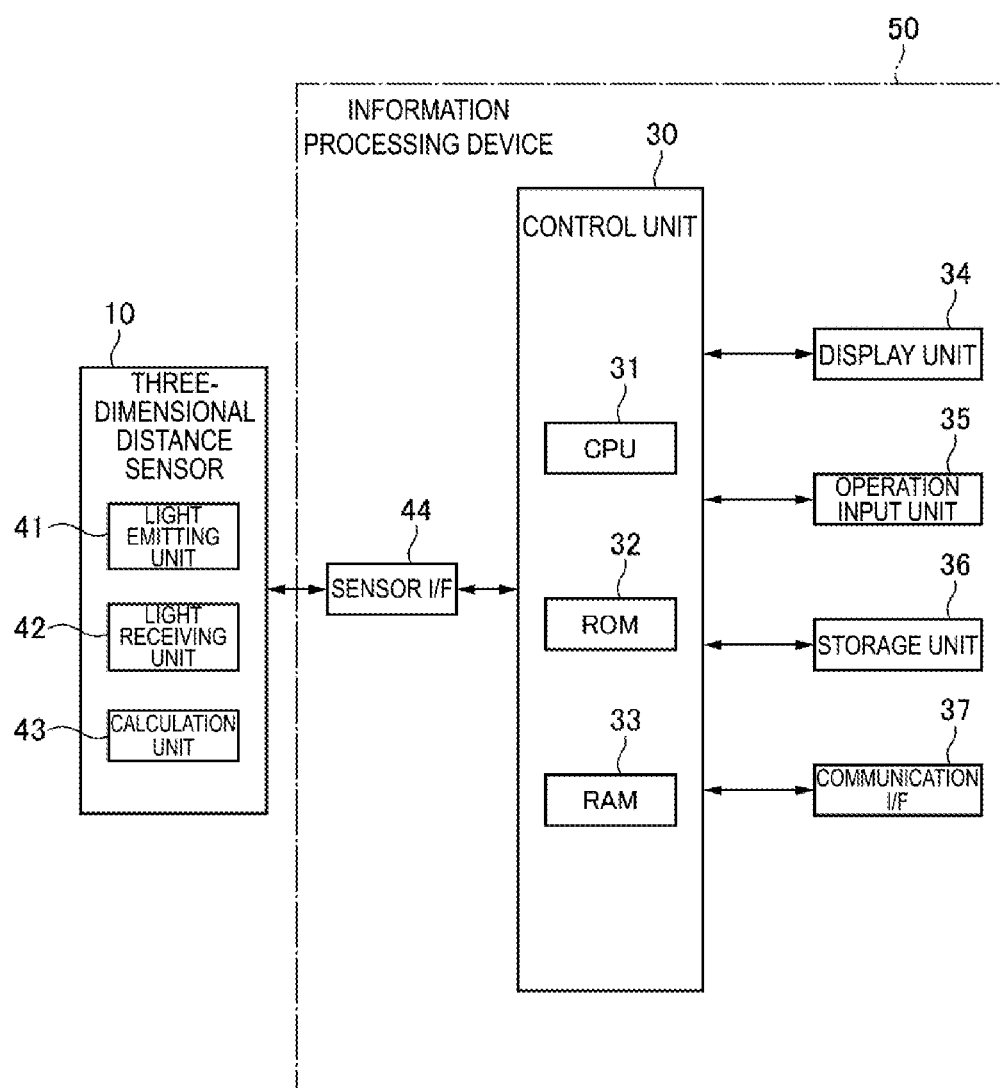
FIG. 1 is a block diagram of a monitoring system including an information processing apparatus and a sensor according to an embodiment of the present invention.
Figure 2:
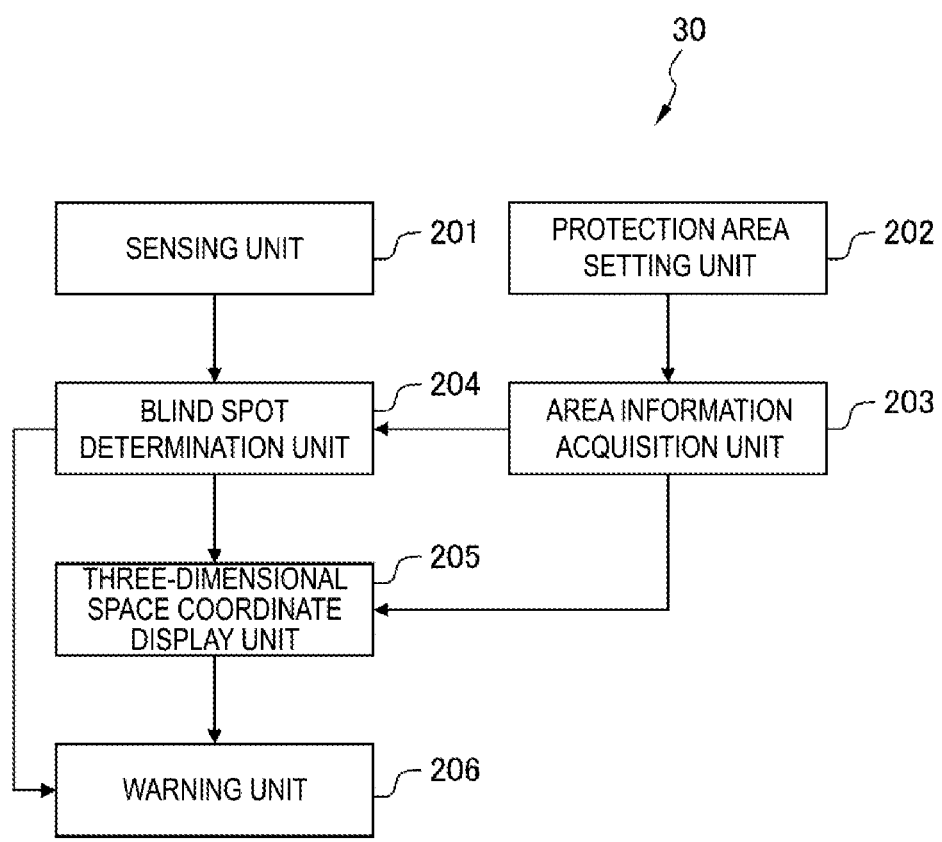
FIG. 2 is a functional block diagram of a control unit.
Figure 3:
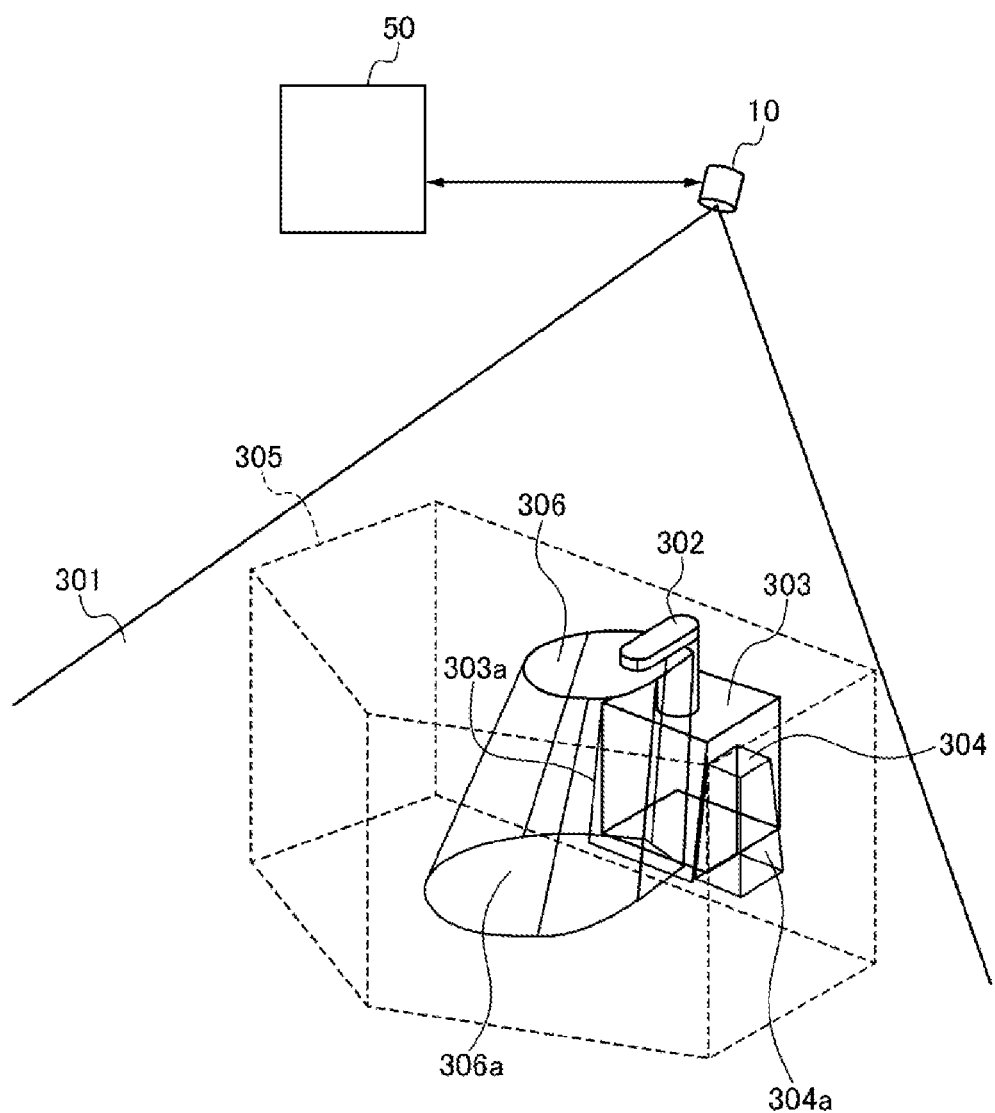
FIG. 3 is a schematic single view drawing of a site at which the monitoring system is used.

An application example of an information processing apparatus according to the present invention will be described with reference to FIGS. 1 to 3. FIG. 1 is a block diagram of a monitoring system including an information processing apparatus 50 and a sensor 10 according to an embodiment of the present invention. FIG. 2 is a functional block diagram of a control unit 30. FIG. 3 is a schematic single view drawing of a site at which the monitoring system is used.

As illustrated in FIG. 3, a three-dimensional distance sensor 10 (hereinafter referred to as "sensor 10") that measures three-dimensional distance and outputs three-dimensional distance information is used at a site. This site is assumed to be a place where monitoring of an object is required, such as a production site where a worker carries out production in cooperation with a work machine such as a robot 302 or a manufacturing apparatus (also referred to as "hazard"). The sensor 10 monitors an object in a virtual three-dimensional protection area 305 determined in consideration of factors such as the installation position and orientation of the sensor 10, the arrangement of the robot 302, and a safe distance.

On the other hand, when the robot 302 is installed on a workbench 303 and moves along a movement line 306 (only a region on the far side of the movement line 306 when viewed from the sensor 10 is illustrated in FIG. 3), which indicates a three-dimensional movement range during actual operation, a blind spot region 306*a* (FIG. 3) occurs. The blind spot region 306*a* is a blind spot of the sensor 10 during the actual operation. A blind spot region, such as the blind spot region 306*a*, present in the protection area 305 is a critical blind spot region where the sensor 10 cannot detect an object despite being in the protection area 305. The user is required to confirm the safety of such a critical blind spot region. However, it is not easy for the user to recognize which region of the site is the critical blind spot region.

Therefore, in the present embodiment, as illustrated in FIG. 3, the user installs the sensor 10 such that the robot 302 is at least partially included in a measurable region 301 of the sensor 10. In this state, a sensing unit 201 (FIG. 2) of the control unit 30 serving as a distance information acquisition unit acquires distance information (three-dimensional information) obtained by measurement and output by the sensor 10. Then, a protection area setting unit 202 (FIG. 2) of the control unit 30 serving as an area setting unit sets a virtual three-dimensional protection area 305 in the measurable region 301 on the basis of the installation position and orientation of the sensor 10, the arrangement of the robot 302, and a safe distance etc. An area information acquisition unit 203 (FIG. 2) of the control unit 30 serving as an area information acquisition unit acquires information relating to the protection area 305 and a 3D model of each object (in the example of FIG. 3, the robot 302, the workbench 303, and the shelf 304) present in the measurable region 301 from a storage unit or an external computer. A blind spot determination unit 204 (FIG. 2) of the control unit 30 serving as a blind spot calculation unit calculates three-dimensional blind spot regions (in the example of FIG. 3, blind spot regions 303*a*, 304*a*, and 306*a* generated by the workbench 303, the movement line 306 of the robot 302, and the shelf 304, respectively), which are each a blind spot of the sensor 10, on the basis of the distance information obtained by measurement by the sensor 10. A three-dimensional space coordinate display unit 205 (FIG. 2) of the control unit 30 serving as a display unit displays the protection area 305 and the blind spot regions in a virtual three-dimensional space. The three-dimensional space coordinate display unit 205 may further display a point cloud based on the distance information obtained by measurement by the sensor 10, the 3D model of the objects acquired by the area information acquisition unit 203, and the like in the virtual three-dimensional space together with the protection area 305 and the blind spot regions.

Here, a warning unit 206 (FIG. 2) of the control unit 30 serving as a warning unit may issue a warning when one of the blind spot regions is at least partially included in the protection area 305.

As illustrated in FIG. 1, the sensor 10 includes a light emitting unit 41, a light receiving unit 42, and a calculation unit 43. The light emitting unit 41 emits light (e.g., infrared light), and the light receiving unit 42 receives reflected light. As an example of the sensor 10, a time-of-flight (TOF) sensor that acquires a distance image from the TOF of light is used. For example, an indirect TOF sensor that estimates a difference in time from a phase difference between projected light and reflected light is used. The sensor 10 outputs, as a measurement result, three-dimensional distance information at different positions in the measurable region 301. The measurement result is supplied to the control unit 30 via a sensor I/F 44 included in an information processing apparatus 50. The sensor 10 is controlled by the control unit 30 via the sensor I/F 44.

The above-described application example is an example for facilitating understanding of the present invention and is not intended to limit interpretation of the present invention.

Embodiments

Next, the configuration of the information processing apparatus 50 and functions and the like of the control unit 30 according to an embodiment of the present invention will be described in detail.

First, the configuration of the information processing apparatus 50 will be described with reference to FIG. 1. The information processing apparatus 50 includes the control unit 30, the sensor I/F 44, a display unit 34, an operation input unit 35, a storage unit 36, and a communication I/F 37. The control unit 30 includes a CPU 31, a ROM 32, a RAM 33, and a timer (not illustrated). A control program executed by the CPU 31 is stored in the ROM 32. Values such as various thresholds are also stored in the ROM 32. The RAM 33 provides the CPU 31 with a working area when the CPU 31 executes the control program.

The display unit 34 is configured by a liquid crystal display or another display and displays various types of information. The display unit 34 may have two or more screens, or may have a function of displaying two or more screens by dividing one screen. The operation input unit 35 receives input of various instructions from the user and transmits this input information to the CPU 31. In addition, the operation input unit 35 may have a function of issuing a warning to the user using sound, a light, or the like on the basis of an instruction from the CPU 31. The storage unit 36 is configured by a nonvolatile memory, for example. The storage unit 36 may be an external memory. The communication I/F 37 is configured to enable wired or wireless communication between the control unit 30 and the robot 302.

Next, each function of the control unit 30 will be described with reference to FIG. 2. The control unit 30 includes the sensing unit 201, the protection area setting unit 202, the area information acquisition unit 203, the blind spot determination unit 204, the three-dimensional space coordinate display unit 205, and the warning unit 206. Each of these functions is implemented as software by running programs stored in the ROM 32. That is, each function is provided by the CPU 31 deploying the necessary program to the RAM 33 and executing the program, thereby performing various calculations and control of hardware resources. In other words, the function of the sensing unit 201 is mainly implemented by cooperation between the CPU 31, the ROM 32, the RAM 33, and the sensor I/F 44. The functions of the protection area setting unit 202 and the area information acquisition unit 203 are mainly implemented by cooperation between the CPU 31, the ROM 32, the RAM 33, the display unit 34, and the operation input unit 35. The function of the blind spot determination unit 204 is mainly implemented by cooperation between the CPU 31, the ROM 32, and the RAM 33. The function of the warning unit 206 is mainly implemented by cooperation between the CPU 31, the ROM 32, the RAM 33, the operation input unit 35, and the communication I/F 37.

The sensing unit 201 acquires the distance information via the sensor I/F 44 from the sensor 10, which is installed such that the robot 302 is at least partially included in the measurable region 301 as illustrated in FIG. 3. The distance information may be, for example, a distance image in which information of a depth distance from the sensor 10 is associated with individual pixels, or point cloud data. Before the robot 302 actually operates, the sensing unit 201 acquires distance information (1) obtained by measurement by the sensor 10 when the robot 302 is stopped and distance information (2) obtained by measurement by the sensor 10 at a plurality of timing while the robot 302 is being moved. These pieces of acquired distance information (1) and (2) are temporarily stored in the RAM 33.

The distance information (1) is used for recognizing objects other than the robot 302 (also referred to as a surrounding object) in the measurable region 301, including the workbench 303 and the shelf 304 illustrated in FIG. 3, a floor, a wall, or a safety fence, and for calculating the blind spot regions 303a, 304a formed by these objects.

The distance information (2) is used for recognizing the movement line 306 of the robot 302, and the blind spot region 306a is calculated on the basis of the movement line 306. Therefore, to recognize a region that is the same as the blind spot region generated by the robot 302 during the actual operation, the distance information (2) is preferably acquired while the robot 302 is being moved in the same way as in actual operation.

The protection area setting unit 202 sets the virtual three-dimensional protection area 305 in the measurable region 301 in consideration of factors such as the installation position and orientation of the sensor 10, the installation position of the robot 302, and the safe distance. Specifically, the protection area setting unit 202 generates, for example, data defined by XYZ coordinates of each vertex of a pentagonal prism as illustrated in FIG. 3 as data of the protection area 305 and stores the data in the storage unit 36.

Here, the safe distance is a distance that can guarantee that the robot 302 completely decelerates and stops before an intruding object entering the protection area 305 reaches the robot 302. The safe distance is determined on the basis of a safety standard, taking into account factors such as the response time of the sensor 10 and the operation speed and braking performance of the robot 302.

Therefore, the protection area setting unit 202 reads out employed robot information (information such as the operation speed and braking performance of the robot 302) and the safety standard information to be used, which are stored in the storage unit 36, and obtains the safe distance on the basis of the read out information.

The storage unit 36 also stores information relating to the installation position and orientation of the sensor 10 and the installation position of the robot 302 in advance. When setting the protection area 305, the protection area setting unit 202 also reads out these pieces of information from the storage unit 36.

The area information acquisition unit 203 acquires information relating to the protection area set by the protection area setting unit 202. Alternatively, the area information acquisition unit 203 may acquire the information relating to the set protection area from the storage unit 36. Furthermore, the area information acquisition unit 203 acquires data of a 3D model of objects (e.g., the robot 301, the workbench 303 and the shelf 304) present in the measurable region 301 from the storage unit 36. The 3D model is data defining the three-dimensional shape of each object and is, for example, CAD data. Note that, the information relating to the protection area and the 3D model of the objects may be acquired from an external computer, an external storage, or the like, instead of from the storage unit 36.

First, the blind spot determination unit 204 (recognition unit) recognizes the movement line 306 of the robot 302. This is because the blind spot region 306a viewed from the sensor 10 and generated by the operation of the robot 302 is calculated on the basis of the range of the movement line 306.

Figure 4:
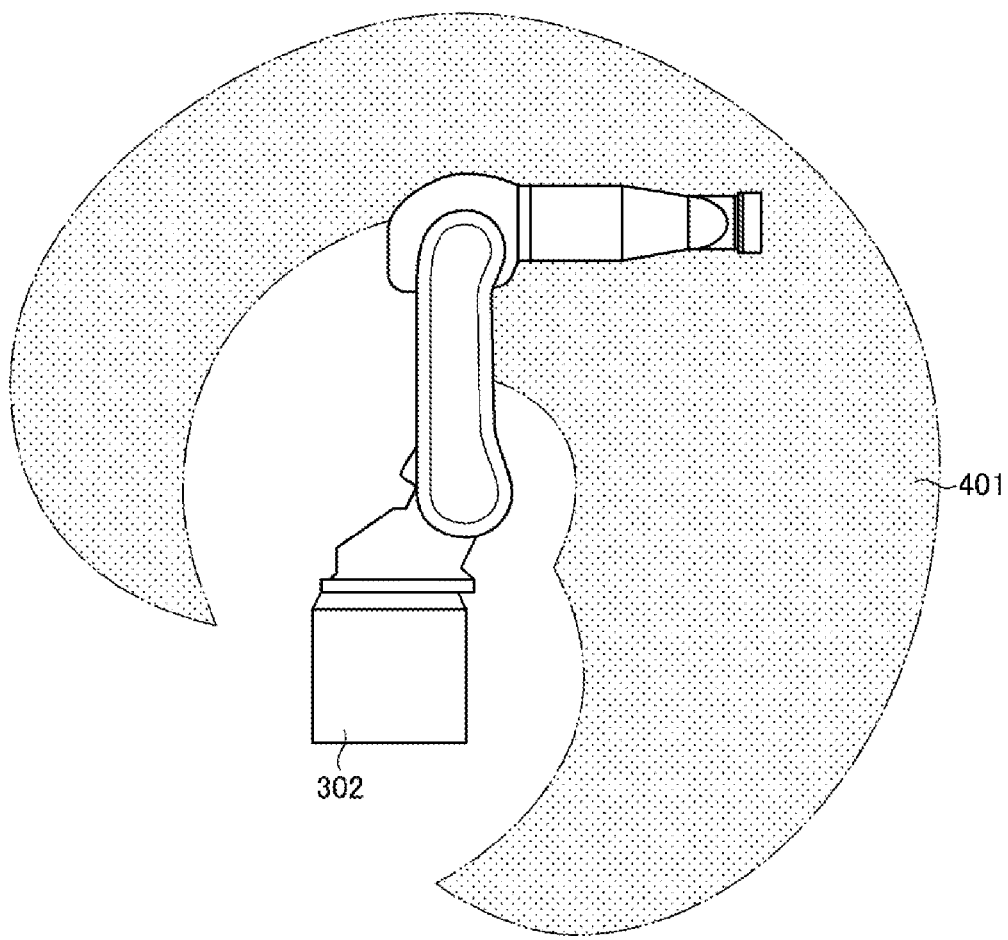
FIG. 4 is a diagram illustrating a movement line of a robot.

More specifically, the blind spot determination unit 204 reads out the distance information (2) acquired by the sensing unit 201 from the RAM 33, and converts the distance information (2) into point cloud information (object range information) of an orthogonal XYZ-coordinate system in a global coordinate system. Similarly, the blind spot determination unit 204 reads out the distance information (1) acquired by the sensing unit 201 from the RAM 33, and converts the distance information (1) into point cloud information (surrounding environment information) of an orthogonal XYZ-coordinate system in a global coordinate system. Then, the blind spot determination unit 204 excludes the surrounding environment information from the object range information. This process generates point cloud information (actual operation information) representing the robot 302 at various timings at which the distance information (2) is obtained. Subsequently, the blind spot determination unit 204 sequentially plots the point cloud information representing the robot 302 at the various timings at which the distance information (2) is obtained, and recognizes a three-dimensional shape 401 surrounding all of the plotted point cloud information as the movement line 306 (FIG. 4) of the robot 302. Accordingly, since the movement range of the robot 302 is recognized as the movement line 306, an accurate blind spot region 306a can be calculated.

Next, the blind spot determination unit 204 calculates the blind spot regions 303a, 304a, and 306a, each being a blind spot region viewed from the sensor 10 generated by a surrounding object (the workbench 303 or the shelf 304) present in the measurable region or the movement line 306 of the robot 302. More specifically, the blind spot determination unit 204 reads out information relating to the installation position and orientation of the sensor 10 from the storage unit 36, and calculates the blind spot regions 303a, 304a, and 306a on the basis of the read out information, the surrounding environment information obtained from the distance information (1), and the three-dimensional shape of the movement line 306 illustrated in FIG. 4. Even more specifically, a region on the far side of the upper surface of the workbench 303 when viewed from the sensor 10 is the blind spot region 303a, a region on the far side of the upper surface of the shelf 304 when viewed from the sensor 10 is the blind spot region 304a, and a region on the far side of the movement line 306 of the robot 302 when viewed from the sensor 10 is the blind spot region 306a.

The blind spot determination unit 204 determines whether any of the blind spot regions 303a, 304a, and 306a is at least partially included in the protection area 305. If any of these blind spot regions is at least partially included in the protection area 305, the blind spot determination unit 204 sends a blind spot detection notification to the warning unit 206.

The three-dimensional space coordinate display unit 205 displays the single view drawing illustrated in FIG. 3 in a virtual three-dimensional space on the display unit 34. Note that while the information processing apparatus 50 and the measurable region 301 are displayed in FIG. 3, these need not be displayed in the virtual three-dimensional space displayed on the display unit 34.

More specifically, the three-dimensional space coordinate display unit 205 displays the single view drawing illustrated in FIG. 3 in the three-dimensional space displayed on the display unit 34 as follows.

First, the three-dimensional space coordinate display unit 205 generates computer graphics (CG) representing the protection area 305 on the basis of the data relating to the protection area 305 acquired by the area information acquisition unit 203, and displays the CG in the three-dimensional space displayed on the display unit 34. In the example in FIG. 3, the outline of the protection area 305 defined by the XYZ coordinates of each vertex of the pentagonal prism is depicted by a wire frame.

Subsequently, the three-dimensional space coordinate display unit 205 generates CG (e.g., a wire frame) representing the blind spot regions 303a, 304a, and 306a calculated by the blind spot determination unit 204, and displays the CG superimposed in the virtual three-dimensional space.

In addition, the three-dimensional space coordinate display unit 205 may display a point cloud, which is generated from the distance information (1) acquired by the sensing unit 201, superimposed in the virtual three-dimensional space. Each point constituting the point cloud corresponds to a point (measurement point) on the surface of an object for which the sensor 10 measured distance. Therefore, displaying the point cloud in the virtual three-dimensional space makes it possible to represent (the outline of) the object present in the measurable region 301. As a result, a user can understand the positional and size relationship between the protection area 305 and the objects 303, 304 present in or in the vicinity of the protection area 305, what kind of blind spot region 303a or 304b is generated by the object 303, 304, and the like.

Furthermore, the three-dimensional space coordinate display unit 205 may display the 3D model of the objects, which is acquired by the area information acquisition unit 203, superimposed in the virtual three-dimensional space. When such a 3D model is used to display the objects, the objects present in the measurable region 301 can be displayed more accurately and in more detail. Note that both the point cloud and the 3D model may be displayed in a superimposed manner, only one of them may be displayed, or display between the two may be switchable.

Note that the range of the protection area 305 displayed on the display unit 34 can be configured by a user operation. For example, the user may move the vertexes of the wire frame by performing an operation using the operation input unit 35. This makes it easy to appropriately set the protection area 305. For example, if the region under the shelf 304 is not at risk because the arm of the robot 302 cannot enter this region, the user can remove this region from the protection area 305.

In the present embodiment, the CGs of the protection area 305 and the blind spot regions 303a, 304a, and 306a are displayed as wire frames. However, no limitation is intended, and another configuration may be adopted as long as the user can recognize the shapes and ranges of these regions. For example, instead of the wire frame, a box-shaped frame, a spherical frame, or a polygon frame may be used.

The blind spot determination unit 204 (second blind spot calculation unit) may calculate a three-dimensional blind spot region 306a' (not illustrated: second blind spot region) that can be a blind spot of the three-dimensional distance sensor from information relating to a three-dimensional maximum movable range of the robot 302 read out from the storage unit 36 and the surrounding environment information stored in the storage unit 36, and the three-dimensional space coordinate display unit 205 may display the blind spot regions 306a and 306a' superimposed in the virtual three-dimensional space in a distinguishable manner by using color coding or the like, or may display the blind spot region 306a', which is switched from the blind spot region 306a in response to a mode switching operation performed by the user, superimposed in the virtual three-dimensional space. With this configuration, the user can understand a critical blind spot region in the blind spot region 306a' in the maximum movable range of the robot 302.

Upon receiving the blind spot detection notification from the blind spot determination unit 204, the warning unit 206 issues a warning to the user via the operation input unit 35. With this configuration, the user can recognize the critical blind spot region more easily.

In addition, the warning unit 206 may issue a hazard warning in a case where the size of the blind spot region in the protection area 305 is greater than or equal to a threshold value. With this configuration, in a case where the blind spot region in the protection area is large enough for a person to enter, for example, the user can be alerted to the fact that the sensor arrangement is hazardous.

When the blind spot region is present in the protection area 305, the warning unit 206 (instruction transmission unit) transmits an instruction to the robot 302 via the communication I/F 37 to change the movement line 306 such that the blind spot region 306a becomes smaller. With this configuration, it is possible to provide the robot 302 with feedback of the measurement result obtained by the sensor 10.

Figure 5:
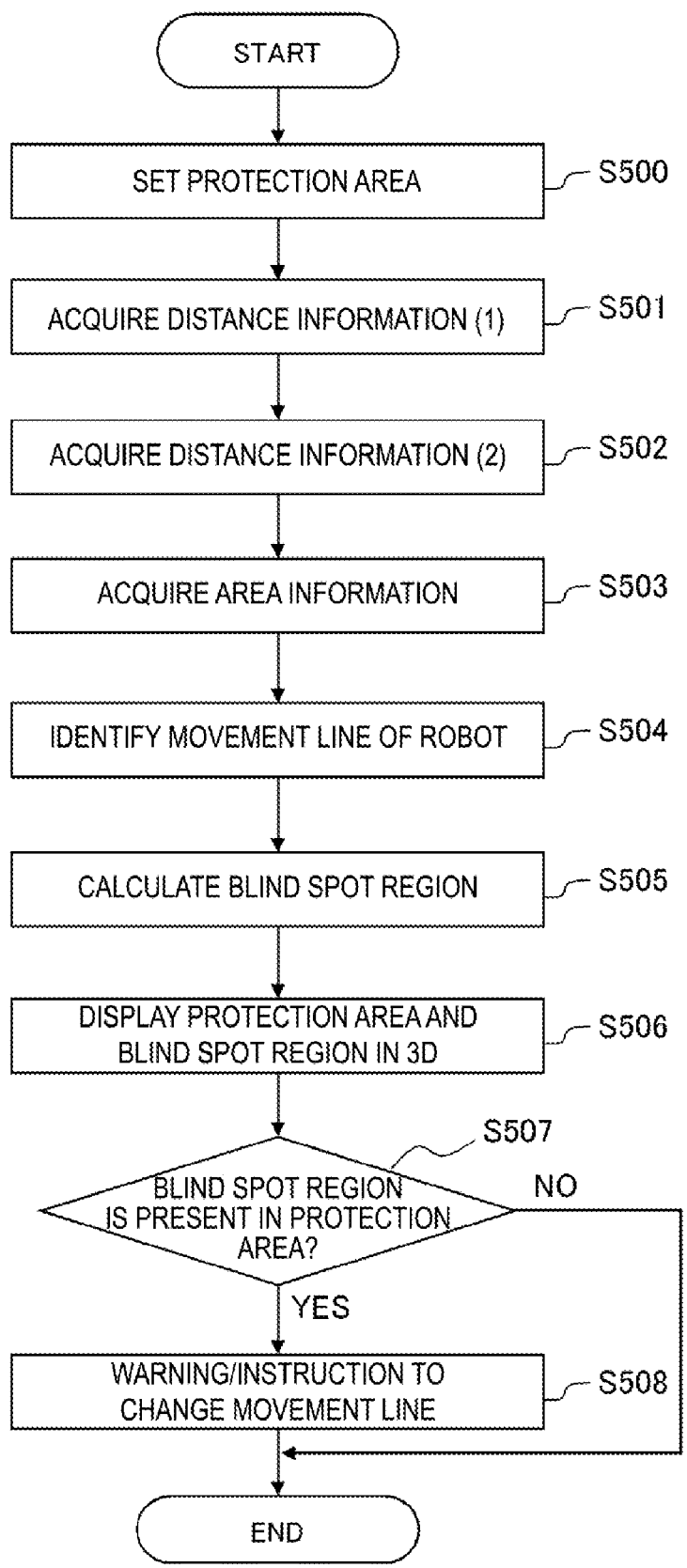
FIG. 5 is a flowchart illustrating blind spot region display processing.

FIG. 5 is a flowchart illustrating blind spot region display processing.

These pieces of processing are implemented by way of the CPU 31 deploying a program stored in the ROM 32 to the RAM 33 and executing the program. The processing is started once an instruction from a user is issued after the user installs the sensor 10 such that the robot 302 is at least partially included in the measurable region 301 of the sensor 10.

First, in step S500, the protection area setting unit 202 reads out the employed robot information, the safety standard information to be used, and the information relating to the installation position and orientation of the sensor 10 and the installation position of the robot 302 from the storage unit 36, and sets the virtual three-dimensional protection area 305 in the measurable region 301 on the basis of the read out information. Note that, in a case where the protection area 305 is already set, the processing of step S500 may be omitted.

In step S501, the user uses the operation input unit 35 to input an instruction to acquire the distance information (1) in a state where the robot 302 is stopped. When an instruction to acquire the distance information (1) is input, the sensing unit 201 acquires the distance information (1) obtained by measurement by the sensor 10.

In step S502, the user causes the robot 302 to start the same operation as the actual operation, and then uses the operation input unit 35 to input an instruction to acquire the distance information (2). When an instruction to acquire the distance information (2) is input, the sensing unit 201 acquires the distance information (2) obtained by measurement by the sensor 10.

In step S503, the area information acquisition unit 203 acquires data such as information relating to the protection area and the 3D model of the objects from the storage unit 36.

In step S504, the blind spot determination unit 204 recognizes the movement line 306 of the robot on the basis of the distance information (1) and the distance information (2).

In step S505, the blind spot determination unit 204 calculates blind spot regions 303a and 304a generated by the surrounding objects (the workbench 303 and the shelf 304) and the blind spot region 306a generated by the movement line 306 of the robot 302.

In step S506, the three-dimensional space coordinate display unit 205 displays the protection area 305 acquired in step S503 and the blind spot regions 303a, 304a, and 306a calculated in step S505 in a virtual three-dimensional space displayed on the display unit 34. Other information, such as the point cloud generated from the distance information (1) and the 3D model acquired in step S503, superimposed in the virtual three-dimensional space may also be displayed.

In step S507, the blind spot determination unit 204 determines whether at least a part of the blind spot regions 303a, 304a, and 306a is present in the protection area 305. In a case where any of the blind spot regions 303a, 304a, and 306a is at least partially present in the protection area 305 (YES in step S507), the blind spot determination unit 204 sends the blind spot detection notification to the warning unit 206, and the processing proceeds to step S508. On the other hand, in a case where no blind spot region is included in the protection area 305 (NO in step S507), the present processing is terminated as it is.

In step S508, when the warning unit 206 receives the blind spot detection notification from the blind spot determination unit 204, the warning unit 206 issues a warning to the user via the operation input unit 35, and transmits an instruction to the robot 302 via the communication I/F 37 to change the movement line 306 such that the blind spot region 306a becomes smaller, and the processing is terminated.

According to the present embodiment, when the sensor 10 is installed such that the robot 302 is at least partially included in the measurable region 301, the control unit 30 sets the virtual three-dimensional protection area 305 in the measurable region 301 and calculates the blind spot region generated by each object on the basis of the distance information obtained by measurement by the sensor 10. Thereafter, the control unit 30 displays the protection area 305 blind spot region in the virtual three-dimensional space displayed on display unit 34. Thus, the user can easily recognize the critical blind spot region.

Note that the three-dimensional distance sensor used as the sensor 10 may be various types of sensor as long as the sensor measures three-dimensional distance and outputs the distance information (three-dimensional information). When a TOF sensor is employed, the TOF sensor may be either a direct TOF sensor or an indirect TOF sensor. In addition to a sensor using light, a sensor using a radio wave, can also be used.

Note that the information processing apparatus 50 can be configured by a computer including a processor, a memory, and a storage, for example. In this case, the configuration illustrated in FIG. 2 is achieved by loading a program stored in the storage into the memory and executing the program by the processor. Such a computer may be a general-purpose computer such as a personal computer, a server computer, a tablet terminal, or a smartphone, or may be an embedded computer such as an on-board computer. Alternatively, the configuration illustrated in FIG. 2 may be wholly or partially configured by an ASIC, an FPGA, or the like. Alternatively, the configuration illustrated in FIG. 2 may be wholly or partially realized by cloud computing or distributed computing.

<Supplementary Note>

[1] An information processing apparatus (50), including:
a distance information acquisition unit (201) configured to acquire distance information obtained by measurement by a sensor (10),
an area information acquisition unit (202) configured to acquire information relating to a virtual three-dimensional protection area set within a measurable region of the sensor,
a blind spot calculation unit (204) configured to calculate a three-dimensional blind spot region representing a blind spot of the sensor, on the basis of the distance information, and
a display unit (205) configured to display the protection area and the blind spot region in a virtual three-dimensional space.

[2] An information processing method, including:
a step (S501, S503) of acquiring distance information obtained by measurement by a sensor (10),
a step (S500) of acquiring information relating to a virtual three-dimensional protection area set in a measurable region of the sensor,
a step (S505) of calculating a three-dimensional blind spot region representing a blind spot of the three-dimensional distance sensor, on the basis of the distance information, and
a step (S506) of displaying the protection area and the blind spot region in a virtual three-dimensional space.

REFERENCE SIGNS LIST

10 Sensor
30 Control unit
50 Information processing apparatus
201 Sensing unit
202 Protection area setting unit
203 Area information acquisition unit
204 Blind spot determination unit
205 Three-dimensional space coordinate display unit
206 Warning unit
301 Measurable region
302 Robot
303 Workbench
304 Shelf
305 Protection area
306 Movement line
303a, 304a, 306a Blind spot region

The invention claimed is:

1. An information processing apparatus, comprising:
a distance information acquisition unit configured to acquire distance information obtained by measurement by a sensor;
an area information acquisition unit configured to acquire information relating to a virtual three-dimensional protection area set within a measurable region of the sensor;

a blind spot calculation unit configured to calculate a three-dimensional blind spot region representing a blind spot of the sensor, on the basis of the distance information; and a display unit configured to display the protection area and the blind spot region in a virtual three-dimensional space; and a recognition unit configured to recognize a movement range of a robot installed in the measurable region from pieces of the distance information obtained by measurement by the sensor at a plurality of timings while the robot is being moved, wherein the blind spot calculation unit calculates the three-dimensional blind spot region generated by the robot from the movement range of the robot recognized by the recognition unit.

2. The information processing apparatus according to claim 1, wherein the display unit further displays a point cloud based on the distance information in the virtual three-dimensional space.

3. The information processing apparatus according to claim 1, wherein the area information acquisition unit acquires a 3D model of an object present in the measurable region, and the display unit further displays the 3D model in the virtual three-dimensional space.

4. The information processing apparatus according to claim 1, further comprising:

a warning unit configured to issue a warning in a case where the blind spot region is at least partially present in the protection area.

5. The information processing apparatus according to claim 4, wherein the warning unit issues a hazard warning in a case where a size of the blind spot region present in the protection area is greater than or equal to a threshold value.

6. The information processing apparatus according to claim 1, wherein a range of the protection area displayed in the virtual three-dimensional space is configurable by a user operation.

7. The information processing apparatus according to claim 1, wherein
the display unit displays the movement range superimposed in the virtual three-dimensional space.

8. The information processing apparatus according to claim 7, further comprising an instruction transmission unit configured to, in a case where the blind spot region generated by the robot is present in the protection area, transmit to the robot an instruction to change the movement range such that the blind spot region decreases.

9. The information processing apparatus according to claim 8, wherein the recognition unit
converts each of the pieces of the distance information obtained by measurement by the sensor at the plurality of timings into object range information indicating ranges occupied by individual objects in the measurable region, excludes, from the object range information, surrounding environment information indicating a range occupied by an object other than the robot in the measurable region to generate actual operation information indicating a range occupied by the robot in the measurable region, and calculates the movement range of the robot by superimposing pieces of the actual operation information acquired at the plurality of timings.

10. The information processing apparatus according to claim 9, further comprising a setting unit configured to set the surrounding environment information on the basis of the distance information obtained by measurement by the sensor in a state where the robot is stopped.

11. The information processing apparatus according to claim 9, wherein each of the pieces of the distance information obtained by measurement by the sensor at the plurality of timings is distance information obtained by measurement by the sensor while the robot is being moved in the same way as the actual operation.

12. The information processing apparatus according to claim 9, wherein the blind spot calculation unit further calculates the blind spot region on the basis of the surrounding environment information.

13. The information processing apparatus according to claim 9, further comprising:

a second blind spot calculation unit configured to calculate a second blind spot region representing a potential blind spot of the sensor from a maximum movable range of the robot, wherein the display unit further displays the second blind spot region superimposed in the virtual three-dimensional space in a state where the second blind spot region is distinguishable from a blind spot region calculated from the movement range of the robot.

14. The information processing apparatus according to claim 9, further comprising a second blind spot calculation unit configured to calculate a second blind spot region representing a potential blind spot of the sensor from a maximum movable range of the robot, wherein the display unit displays the blind spot region calculated from the movement range of the robot or the second blind spot region, which is superimposed in the virtual three-dimensional space, switching the blind spot region and the second blind spot region.

15. An information processing method, comprising:

a step of acquiring distance information obtained by measurement by a sensor;

a step of acquiring information relating to a virtual three-dimensional protection area set in a measurable region of the sensor;

a step of calculating a three-dimensional blind spot region representing a blind spot of the sensor, on the basis of the distance information;

a step of displaying the protection area and the blind spot region in a virtual three-dimensional space; and a step of recognizing a movement range of a robot installed in the measurable region from pieces of the distance information obtained by measurement by the sensor at a plurality of timings while the robot is being moved, wherein the three-dimensional blind spot region generated by the robot is calculated from the recognized movement range of the robot.

16. A non-transitory computer readable medium storing a program that causes a computer to execute each step of an information processing method, comprising:
- a step of acquiring distance information obtained by measurement by a sensor;
- a step of acquiring information relating to a virtual three-dimensional protection area set in a measurable region of the sensor;
- a step of calculating a three-dimensional blind spot region representing a blind spot of the sensor, on the basis of the distance information;
- a step of displaying the protection area and the blind spot region in a virtual three-dimensional space; and
- a step of recognizing a movement range of a robot installed in the measurable region from pieces of the distance information obtained by measurement by the sensor at a plurality of timings while the robot is being moved,
- wherein the three-dimensional blind spot region generated by the robot is calculated from the recognized movement range of the robot.

\* \* \* \* \*